(12) United States Patent
Yasuda et al.

(10) Patent No.: US 6,500,889 B2
(45) Date of Patent: Dec. 31, 2002

(54) FLAME-RETARDED THERMOPLASTIC RESIN COMPOSITION

(75) Inventors: Naoki Yasuda, Kawasaki (JP); Kyuji Ihara, Kawasaki (JP); Takeo Tanaka, Kawasaki (JP); Masaharu Akitsu, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 09/789,539

(22) Filed: Feb. 22, 2001

(65) Prior Publication Data

US 2001/0044488 A1 Nov. 22, 2001

(30) Foreign Application Priority Data

Feb. 23, 2000 (JP) .......................................... 2000-045288

(51) Int. Cl.$^7$ ................................................. C08K 5/02
(52) U.S. Cl. ........................................ 524/424; 524/464
(58) Field of Search .................................. 524/424, 464

(56) References Cited

FOREIGN PATENT DOCUMENTS

| EP | 0 421 307 | 4/1991 |
| EP | 0 595 123 | 5/1994 |

*Primary Examiner*—Kriellion A. Sanders
(74) *Attorney, Agent, or Firm*—Oblon, Spivak, McClelland, Maier & Neustadt, P.C.

(57) ABSTRACT

Herein is disclosed a flame-retarded thermoplastic resin composition which comprises an original flame-retarded thermoplastic resin composition comprising certain amounts of a thermoplastic resin and of a brominated flame-retardant, and, in combination therewith, a certain amount of a dolomite compound, or in addition thereto, a certain amount of at least one compound selected from a hydrotalcite, a zinc-substituted hydrotalcite compound, or a zeolite compound, which flame-retarded thermoplastic resin composition of the present invention are remarkably improved in heat stabilizing effects as compared with the original flame-retarded thermoplastic resin composition.

14 Claims, No Drawings

FLAME-RETARDED THERMOPLASTIC RESIN COMPOSITION

BACKGROUND OF THE INVENTION

1. Technical Field of the Invention

The present invention relates to a stabilized flame-retarded thermoplastic resin composition obtainable, e.g., by adding a specific additive to an original flame-retarded thermoplastic resin composition composed of a thermoplastic resin and a brominated flame-retardant, and it can be used widely in the fields where flame retardancy or flame retardativeness is required.

2. Prior Art

For flame retardation of a thermoplastic resin, it is the common practice to add thereto a flame retardant or a flame retarding assistant such as halogenated compound, phosphorous compound, antimony trioxide or the like. Among these flame retardants, a halogenated compound, particularly a brominated compound is used frequently.

In general, however, such addition of a brominated flame retardant to a thermoplastic resin is accompanied with the problem that a marked deterioration in heat stability of the resulting flame retarded thermoplastic resin occurs upon forming or molding, thereby lowering the commodity value of the molded or formed product. The below-described techniques have already been disclosed to overcome the above-described problems.

(1) A technique of adding a halogen-containing organic flame-retardant, a hydrotalcite stabilizer and a flame retarding assistant to a thermoplastic or thermosetting resin (Japanese Patent Application Laid-Open (Kokai) No. Sho 60-1241), thereby overcoming various problems such as corrosion generation upon molding or forming of the resulting flame-retarded resin composition, and yellowing, lowering in heat resistance, lowering in weather resistance and the like of the molded or formed product. The hydrotalcite stabilizer used according to this technique is the same as the hydrotalcite (Component (b)) to be used according to the present invention. This disclosure, however, includes neither any description of or even suggestion for the dolomite compound to be used according to the present invention nor any description of or even suggestion for the combined use of the hydrotalcite with the dolomite compound.

(2) A technique of adding a hydrotalcite solid solution to a halogen- and/or acid substance-containing synthetic resin (Japanese Patent Application Laid-Open (Kokai) No. Sho 61-174270), thereby improving rust generation resistance and coloring resistance of the resulting resin composition. The hydrotalcite solid solution used according to this technique is the same as the zinc-substituted hydrotalcite compound (Component (c)) to be used according to the present invention. This disclosure, however, includes neither any description of or even suggestion for the dolomite compound to be used according to the present invention nor any description of or even suggestion for the combined use of the hydrotalcite solid solution with the dolomite compound.

(3) A technique of adding zeolite A to a flame retarded resin composed of a polyolefin resin, styrene resin, polyester resin or nylon resin and a halogenated flame retardant (Japanese Patent Application Laid-Open (Kokai) No. Sho 62-199654), thereby improving heat stability of the resulting flame retarded thermoplastic resin. Zeolite A or zeolite containing a Group II or Group IV metal in the periodic table is the same as the zeolite compound (Component (d)) to be used according to the present invention. This disclosure, however, includes neither any description of or even suggestion for the dolomite compound to be used according to the present invention nor any description of or even suggestion for the combined use of the zeolite with the dolomite compound.

SUMMARY OF THE INVENTION

Problems to Be Solved by the Invention

It is impossible to obtain sufficient heat stabilizing effects when in accordance with the conventional technique of adding, to a flame-retarded thermoplastic resin composition composed of a thermoplastic resin and a brominated flame retardant, a hydrotalcite stabilizer as described in Japanese Patent Application Laid-Open (Kokai) No. Sho 60-1241, a hydrotalcite solid solution as described in Japanese Patent Application Laid-Open (Kokai) No. Sho 61-174270 or zeolite A as described in Japanese Patent Application Laid-Open (Kokai) No. Sho 62-199654, singly. There is accordingly a demand for the provision of a flame retarded thermoplastic resin composition excellent in heat stabilizing effects for a flame retarded thermoplastic resin composed of a thermoplastic resin and a brominated flame retardant.

Means to Solve the Problems

With the foregoing in view, the present inventors have proceeded with an extensive investigation on an additive having excellent heat stabilizing effects on a flame-retarded thermoplastic resin composed of a thermoplastic resin and a brominated flame retardant. As a result, it has been found that a flame retarded thermoplastic resin composition obtainable by adding, to an original or initial flame retarded thermoplastic resin composition composed of 100 parts by weight of a thermoplastic resin and 1 to 50 parts by weight of a brominated flame retardant, 0.05 to 5.0 parts by weight of a dolomite compound (Component (a)) has excellent heat stabilizing effects. It has also been found that a flame retarded thermoplastic resin composition obtainable by adding to an original or initial flame-retarded thermoplastic resin composition composed of 100 parts by weight of a thermoplastic resin and 1 to 50 parts by weight of a brominated flame retardant, 0.05 to 5.0 parts by weight of a dolomite compound (Component (a)), and in combination therewith, 0.01 to 5.0 parts by weight of at least one compound selected from the group consisting of a hydrotalcite (Component (b)), a zinc-substituted hydrotalcite compound (Component (c)) and a zeolite compound (Component (d)), has markedly excellent heat stabilizing effects, leading to completion of the present invention.

DETAILED DESCRIPTION OF THE INVENTION

Specific examples of the thermoplastic resin to be used according to the present invention include polyolefins such as polyethylene, polypropylene and the like, styrene resins such as polystyrene (PS), high impact polystyrene (HIPS), syndiotactic polystyrene, acrylonitrile-butadiene-styrene copolymer (ABS resin), acrylonitrile-butadiene-styrene-(α-methyl)styrene copolymer, acrylonitrile-styrene copolymer (AS resin), acrylonitrile-ethylene-styrene copolymer (AES resin), acrylonitrile-acrylic rubber-styrene copolymer (AAS resin) and the like, polyesters such as polyethylene terephthalate, polybutylene terephthalate, polyarylate and the like, polyamides such as nylon 6, nylon 12, nylon 46, nylon 66, nylon 610, nylon 612, nylon MXD6 and the like, polycarbonate, polyacetal, vinyl acetate resin, ethylene-vinyl acetate copolymer, polyvinyl alcohol, polyvinyl acetal, polyphenylene oxide, polysulfone, polyether sulfone and polyphenylene sulfide and blended resins thereof (polymer alloys).

As the brominated flame retardant to be used according to the present invention, those ordinarily employed in this field can be used with no limitations. Among them, popularly employed are flame retardants such as brominated bisphenol A or brominated bisphenol S, brominated phenyl ether, brominated bisphenol A carbonate oligomer, brominated bisphenol A epoxy resin, brominated styrene, brominated phthalimide, brominated benzene and brominated cycloalkane.

As the brominated bisphenol A or brominated bisphenol S, compounds having 1 to 8 bromine atoms bonded to the benzene ring of the bisphenol A residue or bisphenol S residue can be mentioned. Examples thereof include monobromobisphenol A, dibromobisphenol A, tribromobisphenol A, tetrabromobisphenol A, pentabromobisphenol A, hexabromobisphenol A, octabromobisphenol A, tetrabromobisphenol A bis(2-hydroxyethyl ether), tetrabromobisphenol A bis(2-bromoethyl ether), tetrabromobisphenol A bis(1,2-dibromoethyl ether), tetrabromobisphenol A bis(propyl ether), tetrabromobisphenol A bis(3-bromopropyl ether), tetrabromobisphenol A bis(2,3-dibromopropyl ether), monobromobisphenol S, dibromobisphenol S, tribromobisphenol S, tetrabromobisphenol S, pentabromobisphenol S, hexabromobisphenol S, octabromobisphenol S, tetrabromobisphenol S bis(2-hydroxyethyl ether), tetrabromobisphenol S bis (2-bromoethyl ether), tetrabromobisphenol S bis(1,2-dibromoethyl ether), tetrabromobisphenol S bis(propyl ether), tetrabromobisphenol S bis(3-bromopropyl ether), tetrabromobisphenol S bis(2,3-dibromopropyl ether) and the like.

As commercially available brominated bisphenol A or brominated bisphenol S can be mentioned, for example, "FR-1524", ex Bromokem (Far East) Ltd., "Great Lakes BA-50", "Great Lakes BA-50P", "Great Lakes BA-59", "Great Lakes BA-59P" and "Great Lakes PE-68", ex Great Lakes Chemical Corporation, "Saytex RB-100" ex Albemarle Corporation, "Fire Guard 2000", "Fire Guard 3000", "Fire Guard 3100" and "Fire Guard 3600" ex Teijin Chemicals Ltd., "Nonnen PR-2" ex Marubishi Oil Chemical Co., Ltd., and the like.

The brominated phenyl ether are those compounds having at least one bromine atom bonded to the phenyl ether group, and examples thereof include 2,3-dibromopropylpentabromophenyl ether, bis (tribromophenoxy) ethane, pentabromophenylpropyl ether, hexabromodiphenyl ether, octabromodiphenyl ether, decabromodiphenyl ether and polydibromophenylene oxide.

As commercially available brominated phenyl ether flame retardants can be mentioned, for example, "FR-1210" and "FR-1208" ex Bromokem (Far East) Ltd., "Great Lakes FF-680", "Great Lakes DE-83", "Great Lakes DE-83R" and "Great Lakes DE-79", ex Great Lakes Chemical Corporation, and "Saytex RB-102E" and "Saytex 111" ex Albemarle Corporation.

The brominated bisphenol A carbonate oligomer is a polymer of the group represented by the following formula:

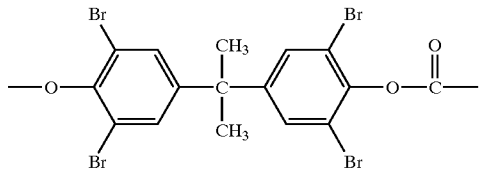

and the term "oligomer" as used herein means that having a polymerization degree (n) of 1 to 10. A flame retardant represented by the following formula:

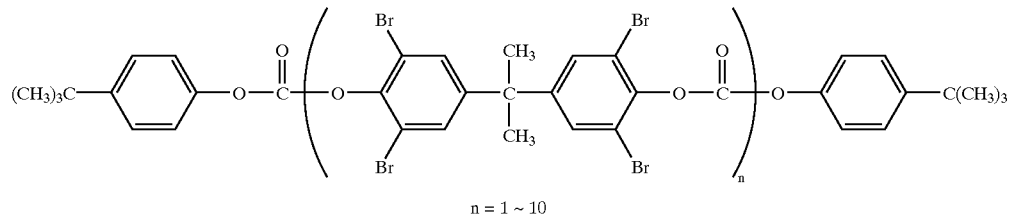

n = 1 ~ 10 can be mentioned by way of example. Examples of the commercially available flame retardant of the above-described formula can include "Fire Guard 7000" and "Fire Guard 7500" ex Teijin Chemicals Ltd.

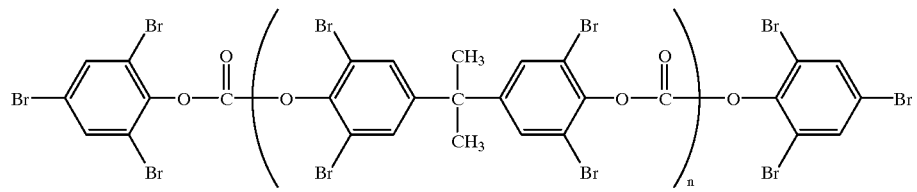

n = 1~10

Examples of the commercially available flame retardant represented by the above-described formula can include "Great Lakes BC-52" and "Great Lakes BC-58" ex Great Lakes Chemical Corporation, and the like.

As examples of the brominated bisphenol A epoxy resin can be mentioned those compounds represented by the following formula:

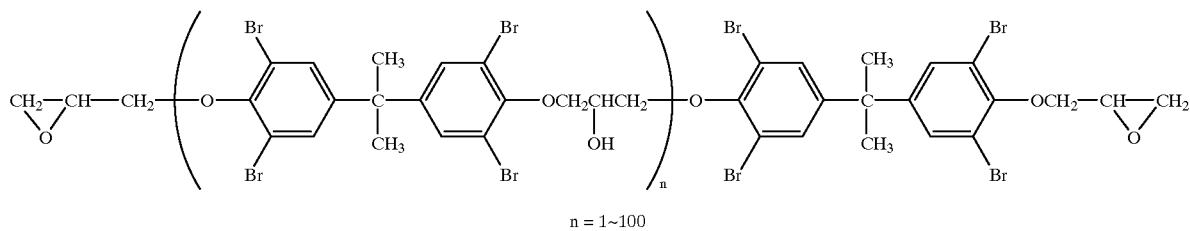

n = 1~100

As the commercially available flame retardant represented by the above-described formula, there are various products depending on the polymerization degree (n). Examples thereof can include "F-2300", "F-2300H", "F-2400" and "F-2400H" ex Bromokem (Far East) Ltd., "PRATHERM EP-16", "PRATHERM EP-30", "PRATHERM EP-100" and "PRATHERM EP-500" ex Dainippon Ink & Chemicals, Incorporated, and "SR-T1000", "SR-T2000", "SR-T5000" and "SR-T20000" ex Sakamoto Yakuhin Kogyo Co., Ltd., and the like.

As the brominated bisphenol A epoxy resin can be mentioned those compounds of the above-described formula wherein the epoxy group at each of both ends has been blocked with a blocking agent, and those compounds of the above-described formula wherein the epoxy group at one end has been blocked with a blocking agent. Although no particular limitations are imposed on the blocking agent insofar as it is a compound permitting the ring-opening addition of the epoxy group, examples thereof can include phenols, alcohols, carboxylic acids, amines, isocyanates and the like, each containing a bromine atom. Among them, brominated phenols are preferred for improving flame retarding effects. Examples thereof can include dibromophenol, tribromophenol, pentabromophenol, dibromoethylphenol, dibromopropylphenol, dibromobutylphenol, dibromocresol and the like.

Examples of the above-described polymer having epoxy groups, at both ends thereof, blocked with a blocking agent, as flame retardants, can include flame retardants represented by the following formulas:

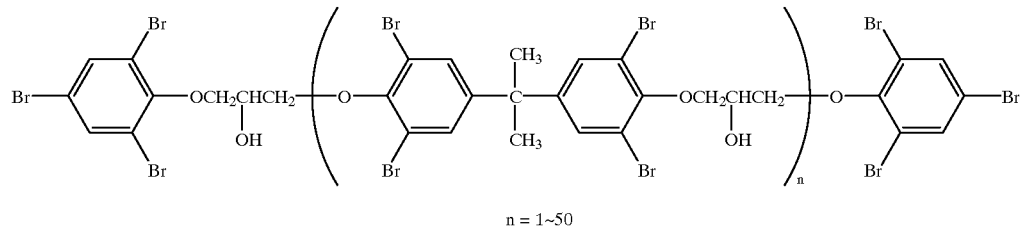

n = 1~50

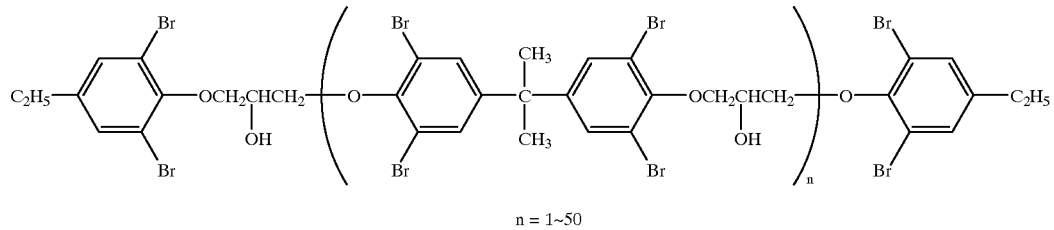

n = 1~50

Examples of the commercially available flame retardant of the above-described formula can include "PRATHERM EC-14", "PRATHERM EC-20" and "PRATHERM EC-30" ex Dainippon Ink & Chemicals, Incorporated, "TB-60" and "TB-62" ex Tohto Chemical Co., Ltd., "SR-T3040" and "SR-T7040" ex Sakamoto Yakuhin Kogyo Co., Ltd., and the like.

Examples of the polymer having an epoxy group, at one end thereof, blocked with a blocking agent, as flame retardants, can include flame retardants represented by the following formulas:

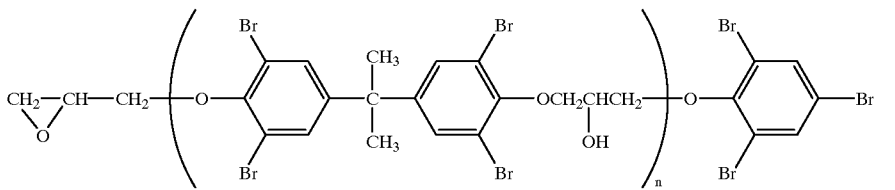

$n = 1\sim100$

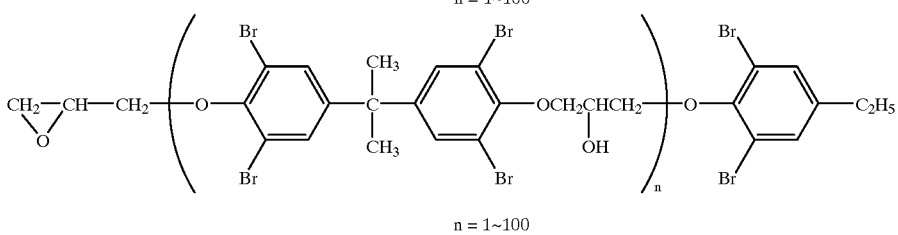

$n = 1\sim100$

Examples of the commercially available flame retardant of the above-described formula can include "PRATHERM EPC-15F" ex Dainippon Ink & Chemicals, Incorporated, "E5354" ex Yuka Shell Epoxy Kabushiki Kaisha, and the like.

The brominated styrene flame retardant is a brominated styrene monomer of the following formula:

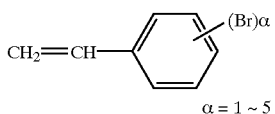

$\alpha = 1 \sim 5$ with 1 to 5 bromine atoms being bonded to the benzene ring of the styrene skeleton, and its polymer of the following formula:

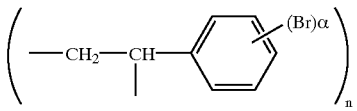

$\alpha = 1 \sim 5, n = 2 \sim 500$ with the polymer being preferred. Bromostyrene and brominated polystyrene can be mentioned by way of example. As commercially available brominated polystyrene flame retardants can be mentioned, for example, "Great Lakes PDBS-10" and "Great Lakes PDBS-80" ex Great Lakes Chemical Corporation, and the like. "Pyrochek 68PB" ex Ferro Inc. can also be mentioned as a brominated polystyrene flame retardant, though it differs from the above-described ones in preparation process.

The brominated phthalimide flame retardant is a compound having 1 to 8 bromine atoms bonded to the benzene ring of 1 or 2 of the phthalimide groups. Examples thereof can include monobromophthalimide, dibromophthalimide, tribromophthalimide, tetrabromophthalimide, ethylenebis(monobromophthalimide), ethylenebis(dibromophthalimide), ethylenebis(tribromophthalimide) and ethylene bis(tetrabromophthalimide) represented by the following formula:

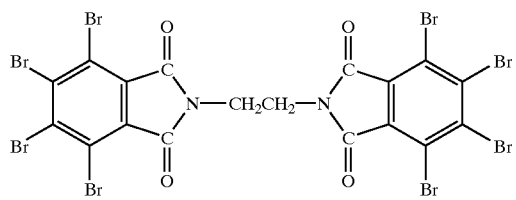

Examples of the commercially available flame retardant can include "Saytex BT-93" and "Saytex BT-93W" ex Albemarle Corporation.

The brominated benzene is a compound having at least one bromine atom bonded to the benzene ring. Examples thereof can include monobromobenzene, dibromobenzene, tribromobenzene, tetrabromobenzene, pentabromobenzene, hexabromobenzene, bromophenylallyl ether, pentabromotoluene, bis(pentabromophenyl)ethane, poly (pentabromobenzyl acrylate), and the like. As a commercially available flame retardant, "Saytex 8010" ex Albemarle Corporation can be mentioned as an example.

The brominated cycloalkane is a brominated hydrocarbon having 1 to 6 bromine atoms bonded to a $C_{6-12}$ cycloalkane (cyclic aliphatic hydrocarbon). Examples of the cycloalkane can include cyclohexane and cyclododecane, while those of the brominated cycloalkane can include monobromocyclohexane, dibromocyclohexane, tribromocyclohexane, tetrabromocyclohexane, pentabromocyclohexane, hexabromocyclohexane, monobromocyclododecane, dibromocyclododecane, tribromocyclododecane, tetrabromocyclododecane, pentabromocyclododecane, hexabromocyclododecane, and the like.

As commercially available hexabromocyclododecanes can be mentioned, for example, "FR-1206" ex Bromokem (Far East) Ltd., "Saytex HBCD" ex Albemarle Corporation, "Greak Lakes CD-75P" ex Great Lakes Chemical Corporation, "Pyroguard SR-103" ex Dai-ichi Kogyo Seiyaku Co., Ltd., and the like.

In Examples which will be described later, popularly-used, typical brominated flame retardants are employed among them, but the other brominated flame retardants referred to above are expected to exhibit similar effects.

Other than the popularly-used brominated flame retardants as exemplified above, those which are shown in the literature or catalogues of brominated flame retardant makers can also be employed. Flame retarded thermoplastic resin compositions containing such brominated flame retardant are expected to actualize the advantages of the present invention equally. Examples of such brominated flame retardant can include brominated phenols, brominated phenoxytriazines, brominated alkanes, brominated isocyanurates, brominated maleimides, brominated phthalic acids, and the like.

Brominated phenols are compounds having 1 to 5 bromine. atoms bonded to the phenol group, and examples thereof can include monobromophenol, dibromophenol, tribromophenol, tetrabromophenol, pentabromophenol, and the like.

Brominated phenoxytriazines are compounds wherein 1 to 5 bromine atoms have been bonded to each of the phenoxy groups to form a brominated phenoxy froup and 1 to 3 brominated phenoxy groups have been bonded to a triazine ring. Examples thereof can include mono(monobromophenoxy)triazine, mono(dibromophenoxy)triazine, mono(tribromophenoxy)triazine, mono(pentabromophenoxy)triazine, bis(monobromophenoxy)triazine, bis(dibromophenoxy)triazine, bis(tribromophenoxy)triazine, bis(pentabromophenoxy)triazine, tris(monobromophenoxy)triazine, tris(dibromophenoxy)triazine, tris(pentabromophenoxy)triazine and tris(tribromophenoxy)triazine represented by the following formula:

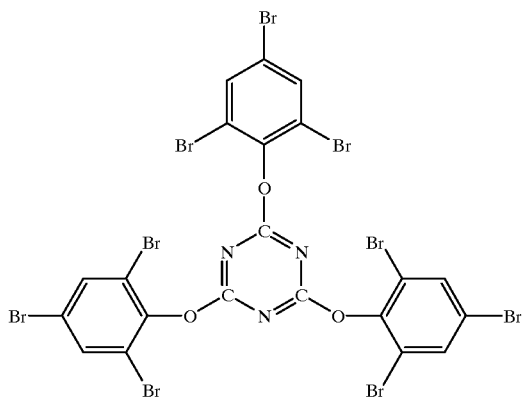

As a commercially available flame retardant represented by the above-described formula, "Pyroguard SR-245" ex Dai-ichi Kogyo Seiyaku Co., Ltd. can be mentioned.

Brominated alkanes are compounds having 1 to 8 bromine atoms bonded to a $C_{2-6}$ alkane (chain aliphatic hydrocarbon). Examples of the alkane can include ethane, propane, butane, pentane and hexane, while those of the brominated alkane can include monobromoethane, dibromoethane, tetrabromoethane, monobromopropane, dibromopropane, tribromopropane, pentabromopropane, hexabromopropane, octabromopropane, monobromobutane, dibromobutane, tetrabromobutane, hexabromobutane, octabromobutane, monobromopentane, dibromopentane, tribromopentane, pentabromopentane, octabromopentane, monobromohexane, dibromohexane, tribromohexane, tetrabromohexane, pentabromohexane, hexabromohexane, octabromohexane, and the like.

Examples of the brominated isocyanurate can include compounds wherein the alkyl residue of the above-described brominated alkane and an isocyanuric acid residue are bonded to each other, and compounds wherein a brominated phenoxy group having 1 to 5 bromine atoms bonded to a phenoxy group and an isocyanuric acid residue are bonded to each other. Specific examples thereof can include tris(monobromoethyl)isocyanurate, tris(dibromoethyl)isocyanurate, tris(tetrabromoethyl)isocyanurate, tris(monobromopropyl)isocyanurate, tris(2,3-dibromopropyl)isocyanurate, tris(tribromopropyl)isocyanurate, tris(tetrabromopropyl)isocyanurate, tris(pentabromopropyl)isocyanurate, tris(heptabromopropyl)isocyanurate, tris(monobromobutyl)isocyanurate, tris(dibromobutyl)isocyanurate, tris(pentabromobutyl)isocyanurate, tris(octabromobutyl)isocyanurate, tris(monobromopentyl)isocyanurate, tris(dibromopentyl)isocyanurate, tris(pentabromopentyl)isocyanurate, tris(octabromopentyl)isocyanurate, tris(monobromohexyl)isocyanurate, tris(dibromohexyl)isocyanurate, tris(tribromohexyl)isocyanurate, tris(pentabromohexyl)isocyanurate, tris(monobromophenoxy)isocyanurate, tris(dibromophenoxy)isocyanurate, tris(tribromophenoxy)isocyanurate, tris(pentabromophenoxy)isocyanurate, tris(monobromoethylphenoxy)isocyanurate, tris(dibromoethylphenoxy)isocyanurate, tris(tetrabromoethylphenoxy)isocyanurate, tris(monobromopropylphenoxy)isocyanurate, tris(dibromopropylphenoxy)isocyanurate, tris(tetrabromopropylphenoxy)isocyanurate, and the like.

Brominated maleimides are compounds having 1 to 5 bromine atoms bonded to the phenylmaleimide group. Examples thereof can include monobromophenylmaleimide, dibromophenylmaleimide, tribromophenylmaleimide, pentabromophenyl maleimide, and the like.

Brominated phthalic acids are compounds having 1 to 4 bromine atoms bonded to phthalic anhydride. Examples thereof can include monobromophthalic anhydride, dibromophthalic anhydride, tribromophthalic anhydride, tetrabromophthalic anhydride, and the like.

The amount of the brominated flame retardant to be used according to the present invention varies depending on the relationship between the extent of the flame retardation required of a thermoplastic resin and physical properties. However, the flame retardant is usually used in an amount of 1 to 50 parts by weight based on 100 parts by weight of a thermoplastic resin. In an amount less than 1 part by weight, desired flame retardancy cannot be imparted. Amounts exceeding 50 parts by weight bring about sufficient flame retardancy but may impair the physical properties of the molded or formed product of the resulting resin composition. Amounts outside the above-described range are therefore not preferred. From the viewpoint of keeping good balance between the flame retardancy and physical properties, the amount practically falls within a range of 3 to 30 parts. Depending on the using purpose, two or more brominated flame retardants can be used in combination.

A flame retarding assistant such as antimony oxide is often used in combination with a flame retardant in order to heighten the flame retarding effects further. Addition of such flame retarding assistant does not adversely affect the advantages of the present invention. The flame retarding assistant is usually added in an amount of 0.5 to 20 parts by weight based on 100 parts by weight of a thermoplastic resin, with 1 to 7 parts by weight being preferred judging from the relationship with physical properties and the like.

No particular limitations are imposed on the dolomite compound to be used according to the present invention, said compound being sometimes referred to as Component (a). Any dolomite that is widely produced in nature and used as a wall material or refractory for iron manufacture can be employed. In addition, synthetic dolomite having a chemical composition formed of a complex salt of calcium carbonate and magnesium carbonate can also be employed.

Natural dolomite and/or synthetic dolomite to be used according to the present invention may have a composition wherein magnesium and calcium are mixed at a certain ratio, of which a weight ratio of the magnesium to the calcium falling within a range of 5:95 to 95:5 in terms of MgO:CaO is preferred. When natural dolomite and/or synthetic dolomite having a weight ratio outside the above range is employed, sufficient heat stabilizing effects are not available.

According to the present invention, it is also possible to use a derivative obtained by sintering or lime slaking such natural dolomite and/or synthetic dolomite, thereby modifying it without largely changing its metal element composition. Specific examples can include dolomite cement obtainable by heating dolomite at 700 to 800° C., light burned dolomite obtainable by heating at 900 to 1000° C., dead burned dolomite obtainable by dead burning at as high as 1600 to 1800° C., magnesia slaked lime obtainable by slaking light burned dolomite by adding water, synthetic magnesia-dolomite clinker, and the like. In addition, usable are derivatives obtainable by modifying a natural mineral or synthetic complex, such as akermanite ($Ca_2MgSi_2O_7$), diopside [$CaMg(SiO_3)_2$] or various kinds of slag, which contains calcium and magnesium at a ratio falling within the same range as that of the above-described synthetic dolomite. Any mixture of them may also be employed.

The above-exemplified dolomites and derivatives thereof will hereinafter be collectively called "dolomite compounds" in this specification. These dolomite compounds are produced industrially in a wide field and in a large amount. Since they are used in various industries such as steel manufacture, pottery, building material manufacture, agriculture, and the like, they have a stable quality and available easily at a low cost. A flame retarded, thermoplastic resin composition obtainable by using light burned dolomite, among the above-exemplified flame retardants, exhibits-the best heat stabilizing effects.

According to the present invention, the dolomite compound surface-treated with a surface treating agent can be used for improving the dispersibility, compatibility or the like between the, dolomite compound and the flame retarded thermoplastic resin. Organic acids and metal salts of organic acids can be used as the surface treating agent for the dolomite compound. These compounds may be used either singly or in combination.

Examples of the organic acid to be used as the surface treating agent can include saturated aliphatic monocarboxylic acids, saturated aliphatic dicarboxylic acids, unsaturated aliphatic carboxylic acids, carbocyclic carboxylic acids, heterocyclic carboxylic acids, hydroxy acids, amino acids, amino acid derivatives, and the like.

Specific examples of the saturated aliphatic monocarboxylic acid can include acetic acid, propionic acid, butyric acid, valeric acid, hexanoic acid, octanoic acid, lauric acid, stearic acid, behenic acid, and the like.

Specific examples of the saturated aliphatic dicarboxylic acid can include oxalic acid, malonic acid, succinic acid, adipic acid, sebacic acid, and the like.

Specific examples of the unsaturated aliphatic carboxylic acid can include acrylic acid, oleic acid, crotonic acid, fumaric acid, and the like.

Specific examples of the carbocyclic carboxylic acid can include benzoic acid, camphoric acid, phthalic acid, toluic acid, hydroatropic acid, cinnamic acid, and the like.

Specific examples of the heterocyclic carboxylic acid can include furoic acid, thenoic acid, pyrrolidonecarboxylic acid, nicotinic acid, and the like.

Specific examples of the hydroxy acid can include lactic acid, malic acid, benzilic acid, salicylic acid, anisic acid, vanillic acid, protocatechuic acid, gallic acid, and the like.

Specific examples of the amino acid and amino acid derivative can include alkoxylic acid, glutamic acid, lysine, aspartic acid, glycine, N-stearoylglycine, N-acetylglutamic acid, N-lauroylleucine, γ-methylglutamic acid, and the like.

As the metal salt of an organic acid to be used as the surface treating agent, the metal salts of the above-exemplified organic acids can be mentioned. Specific examples of the metal of the metal salts can include zinc, calcium, magnesium, potassium, sodium, lithium, aluminum, nickel, and the like. A mixture or complex salt of at least two of these metal salts may be used.

Other surface treating agents than the above-exemplified ones and used industrially can be used as needed, in combination with the above-exemplified oness within an extent not impairing the advantages of the present invention. Specific examples can include higher fatty acid esters, coupling agents such as silane-, aluminum- and phosphorous-based ones, surfactants such as anionic, cationic and nonionic ones, higher fatty acid esters, polymer-based dispersants, and the like.

Although the amount of the surface treating agent to be used varies with the kind of the dolomite compound to be employed, specific surface area of its powder particles and moisture content bonded to the surface thereof, the surface treating agent is added or used in an amount of 0.05 to 40 wt. %, preferably 0.1 to 2.0 wt. % based on the dolomite compound to be treated therewith. Amounts of the surface treating agent less than 0.05 wt. % hardly bring about the effects of surface treatment. Amounts exceeding 40 wt. %, on the other hand, do not bring about surface treating effects in proportion to the amount, because the surface of the particles of the dolomite compound powders gets saturated with the treating agent.

No particular limitations are imposed on the surface treating procedures. Examples can include (1) a method of adding a surface treating agent to dolomite compound powders followed by co-grinding the resulting mixture in a grinder such as Henschel mixer, colloid mill, ball mill, atomizer, or the like, and (2) a method of adding a surface treating agent and the dolomite compound in a proper solvent such as toluene, xylene, methyl ethyl ketone, acetonitrile, chloroform, dimethyl ether, water, ethanol, methanol, or the like, followed by stirring the mixture and then removing the solvent therefrom.

The hydrotalcite to be used according to the present invention is a compound composed of magnesium and aluminum, said hydrotalcite being sometimes referred to as Component (b), and examples thereof can include compounds represented by the following general formula (1):

$$Mg_{1-x}Al_x(OH)_2(A^{q-})_{x/q} \cdot aH_2O \qquad (1)$$

The zinc-substituted hydrotalcite compound is a compound of the formula (1) wherein Mg has been partially substituted with Zn, said zinc-substituted hydrotalcite compound being sometimes referred to as Component (c). Examples thereof can include the compounds of the following general formula (2):

$$Mg_{y1}Zn_{y2}Al_x(OH)_2(A^{q-})_{x/q} \cdot aH_2O \qquad (2)$$

A substitution ratio of Zn for Mg is 1 mole % to 50 mole %, preferably 15 mole % to 30 mole %. [In the formulas (1) and (2), q stands for 1 or 2, $A^{q-}$ is an anion having a valence of q, that is, $(CO_3)^{2-}$ or $(ClO_4)^-$ and x, y1, y2 and a each stands for a real number satisfying the following conditions:

$$0<x\leq 0.5,\ y1+y2=1-x,\ y1\geq y2,\ 0\leq a<1]$$

Typical examples of the hydrotalcite of the formula (1) can include:

No. 1: $Mg_{0.750}Al_{0.250}(OH)_2(CO_3)_{0.125} \cdot 0.5H_2O$,
No. 2: $Mg_{0.692}Al_{0.308}(OH)_2(CO_3)_{0.154} \cdot 0.1H_2O$,
No. 3: $Mg_{0.683}Al_{0.317}(OH)_2(CO_3)_{0.159} \cdot 0.5H_2O$,
No. 4: $Mg_{0.667}Al_{0.333}(OH)_2(CO_3)_{0.167} \cdot 0.1H_2O$,
No. 5: $Mg_{0.750}Al_{0.250}(OH)_2(ClO_4)_{0.250} \cdot 0.5H_2O$,
No. 6: $Mg_{0.692}Al_{0.308}(OH)_2(ClO_4)_{0.308} \cdot 0.1H_2O$, and
No. 7: $Mg_{0.667}Al_{0.333}(OH)_2(ClO_4)_{0.333} \cdot 0.1H_2O$.

Typical examples of the zinc-substituted hydrotalcite compounds represented by the formula (2) can include:

No. 8: $Mg_{0.625}Zn_{0.125}Al_{0.125}(OH)_2(CO_3)_{0.125} \cdot 0.45H_2O$,
No. 9: $Mg_{0.538}Zn_{0.154}Al_{0.308}(OH)_2(CO_3)_{0.154}$
No. 10: $Mg_{0.500}Zn_{0.167}Al_{0.333}(OH)_2(CO_3)_{0.167} \cdot 0.54H_2O$,
No. 11: $Mg_{0.625}Zn_{0.125}Al_{0.250}(OH)_2(ClO_4)_{0.250} \cdot 0.3H_2O$,
No. 12: $Mg_{0.538}Zn_{0.154}Al_{0.308}(OH)_2(ClO_4)_{0.308} \cdot 0.5H_2O$, and
No. 13: $Mg_{0.500}Zn_{0.167}Al_{0.333}(OH)_2(ClO_4)_{0.333} \cdot 0.1H_2O$.

According to the present invention, also usable is the hydrotalcite or zinc-substituted hydrotalcite compound subjected to surface treatment with a surface treating agent, for example, a higher fatty acid, to improve the dispersibility or compatibility of the hydrotalcite or zinc-substituted hydrotalcite compound with the flame-retarded thermoplastic resin. Specific examples of the commercially-available, surface-treated hydrotalcite can include "Alcamizer 2", "Alcamizer 3", "DHT-4A", "DHT-4A-2", and the like, ex Kyowa Chemical Industry Co., Ltd. Those of the commercially-available, surface-treated zinc-substituted hydrotalcite compound can include "Alcamizer 4", "Alcamizer 4-2", "Alcamizer 7", and the like, ex Kyowa Chemical Industry Co., Ltd.

As the surface treating agent, those described in the known literature, for example, those described on page 4 of Japanese Patent Application Laid-Open (Kokai) No. Sho 60-1241 can be used, other than the above-described higher fatty acids.

Surface treating agents as described in this known literature are those ordinarily employed in this field, for example, anionic surfactants, silane coupling agents, titanium coupling agents, higher fatty acid esters, and the like. Specific examples thereof include anionic surfactants such as sodium stearate, sodium oleate, sodium laurylbenzenesulfonate, and the like, silane- or titanium-based coupling agents such as vinyl triethoxysilane, γ-aminopropyltrimethoxysilane, isopropyltriisostearoyl titanate, isopropyltridecylbenzenesulfonyl titanate and the like, and higher fatty acid esters such as glycerin monostearate, glycerin monoleate and the like.

As the zeolite compound to be used according to the present invention, said zeolite compound being sometimes referred to as Component (d), usable are zeolite 4A compounds represented by the following general formula (3):

$$Na_{12}Al_{12}Si_{12}O_{48} \cdot bH_2O \qquad (3)$$

[in the formula (10), b stands for a real number satisfying $0 \leq b \leq 36$], zeolite 3A compounds obtainable by substituting potassium for the sodium of the zeolite 4A compounds, zeolite 5A compounds obtainable by substituting calcium for the sodium of the zeolite 4A compounds, zeolite 13X compounds having a composition of $Na_{86}Al_{86}Si_{106}O_{384} \cdot 264H_2O$, zeolite 10X compounds obtainable by substituting calcium for the sodium of the 13X type zeolite compounds and zeolite compounds obtainable by partially substituting, for the sodium of the zeolite 4A compound, metal(s) of the Group II or Group IV in the periodic table such as magnesium, zinc, strontium, barium, zirconium, tin or the like (said zeolite compounds being hereinafter called metal-substituted zeolite compounds).

With regards to the metal-substituted zeolite compounds, no particular limitations are imposed on the metal of the Group II or Group IV in the periodic table which is partially substituted for the sodium of the zeolite 4A compound. As the metal to be used for substitution in consideration of effects, toxicity, availability and the like, magnesium, zinc, strontium, barium, zirconium, tin and the like can be mentioned. Specific examples of the metal-substituted zeolite can include synthetic zeolites such as magnesium-substituted zeolite, zinc-substituted zeolite, strontium-substituted zeolite, barium-substituted zeolite, zirconium-substituted zeolite, tin-substituted zeolite, and the like. Among them, magnesium-, zinc- or barium-substituted zeolite compounds are preferred.

Incidentally, the zeolite 3A compounds, zeolite 5A compounds, zeolite 10X compounds and metal-substituted zeolite compounds usually obtainable industrially are zeolite 4A compounds or zeolite 13X compounds whose sodium has been substituted with a metal at a substitution ratio of 10 mole % to 70 mole %.

Among the zeolite compounds to be used according to the present invention, said zeolite compound being sametimes referred to as Component (d), zeolite 4A compounds and zeolite 5A compounds are most preferred.

Specific examples of the zeolite 4A compound can include $Na_{12}Al_{12}Si_{12}O_{48}$, $Na_{12}Al_{12}Si_{12}O_{48} \cdot 6H_2O$, $Na_{12}Al_{12}Si_{12}O_{48} \cdot 12H_2O$, $Na_{12}Al_{12}Si_{12}O_{48} \cdot 21H_2O$, $Na_{12}Al_{12}Si_{12}O_{48} \cdot 27H_2O$, and $Na_{12}Al_{12}Si_{12}O_{48} \cdot 36H_2O$.

Specific examples of the commercially available zeolite 4A compound can include "Zeostar NA-100P" and "Zeostar NA-100P" ex Nippon Chemical Industrial Co., Ltd., "Toyobuilder" ex TOSOH CORPORATION, and the like.

Specific examples of the commercially available zeolite 3A compound can include "Zeostar KA-100P" and "Zeostar KA-110P" ex Nippon Chemical Industrial Co., Ltd.; those of the commercially available zeolite 5A can include "Zeostar CA-100P" and "Zeostar CA-110P" ex Nippon Chemical Industrial Co., Ltd.; those of the commercially available zeolite 13X compound can include "Zeostar NX-100P" and "Zeostar NX-110P" ex Nippon Chemical Industrial Co., Ltd.; and those of the commercially available zeolite 10X compound can include "Zeostar CX-100P" and "Zeostar CX-110P" ex Nippon Chemical Industrial Co., Ltd.

The zeolite compounds to be used according to the present invention may each be surface treated with an alkali metal salt of a higher fatty acid, for example, an alkali metal salt of stearic acid, oleic acid, or the like; or the alkali metal salt of an organic sulfonic acid such as dodecylbenzenesulfonic acid or the like.

The above-described synthetic zeolite may be prepared by the known process, for example, the preparation process as described in Japanese Patent Application Laid-Open (Kokai) No. Sho 57-28145.

The dolomite compound to be used according to the present invention (Component (a)) is added in an amount of 0.01 to 5.0 parts by weight, preferably 0.05 to 3.0 parts by weight, based on 100 parts by weight of the thermoplastic resin.

Amounts of the dolomite compound (Component (a)) less than 0.01 part by weight do not bring about sufficient heat stabilizing effects, whereas amounts exceeding 5.0 parts by weight, on the other hand, do not bring about heat stabilizing effects expected from an amount increase.

The at least one compound to be selected for use according to the present invention from the hydrotalcite (Component (b)), the zinc-substituted hydrotalcite compounds (Component (c)) and the zeolite compound (Component (d)) is used or added in an amount of 0.01 to 5.0 parts by weight, preferably 0.05 to 3.0 parts by weight based on 100 parts by weight of the thermoplastic resin.

Incidentally, when the amount of the at least one compound selected from Component (b), Component (c) and Component (d) is less than 0.01 part by weight, marked heat stabilizing effects are not provided, whereas when it exceeds 5.0 parts by weight, on the other hand, heat stabilizing effects expected from an increase in the amount are not provided.

No particular limitations are imposed on the ratio of Component (a) and at least one compound selected from the group consisting of Component (b), Component (c) and Component (d) when used in combination. They may be used at any ratio.

When at least two compounds selected from Component (b), Component (c) and Component (d) are used in combination, no particular limitations are imposed on the ratio. They may be used at any ratio.

The heat stabilizing effects of the present invention are not adversely affected even by the addition of a filler such as glass fiber, carbon fiber, an inorganic substance or the like to the flame-retarded thermoplastic resin composition of the present invention.

If necessary, an antioxidant, ultraviolet absorber, lubricant, pigment and/or the like can be added.

The flame retarded thermoplastic resin composition of the present invention is obtainable by kneading the necessary components in a calendar roll, extruder, Banbury mixer, kneader or the like. Upon kneading, all the components may be kneaded simultaneously or kneaded after separately added.

The following flame-retarded thermoplastic resin compositions can be mentioned as examples, which can be made according to the present invention.

(1) A flame-retarded thermoplastic resin composition obtainable by adding, to an original or initial flame retarded thermoplastic resin composition composed of 100 parts by weight of a thermoplastic resin and 1 to 50 parts by weight of a brominated flame retardant, 0.01 to 5.0 parts by weight of Component (a): a dolomite compound.

(2) A flame-retarded thermoplastic resin composition obtainable by adding to an original flame-retarded thermoplastic resin composition composed of 100 parts by weight of a thermoplastic resin and 1 to 50 parts by weight of a brominated flame retardant, 0.01 to 5.0 parts by weight of Component (a): natural dolomite and/or synthetic dolomite composed of a calcium carbonate-magnesium carbonate complex salt.

(3) A flame-retarded thermoplastic resin composition obtainable by adding, to an original flame-retarded thermoplastic resin composition composed of 100 parts by weight of a thermoplastic resin and 1 to 50 parts by weight of a brominated flame retardant, 0.01 to 50 parts by weight of-Component (a): natural dolomite and/or synthetic dolomite composed of a calcium carbonate-magnesium carbonate complex salt, each having a magnesium to calcium weight ratio of 5:95 to 95:5 in terms of MgO:CaO.

(4) A flame-retarded thermoplastic resin composition obtainable by adding, to an original flame-retarded thermoplastic resin composition composed of 100 parts by weight of a thermoplastic resin and 1 to 50 parts by weight of a brominated flame retardant, 0.01 to 5.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO.

(5) A flame-retarded thermoplastic resin composition obtainable by adding, to an original flame-retarded thermoplastic resin composition composed of 100 parts by weight of a thermoplastic resin and 3 to 30 parts by weight of a brominated flame retardant, 0.05 to 3.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO.

(6) A flame-retarded thermoplastic resin composition obtainable by adding, to an original flame retarded thermoplastic resin composition composed of 100 parts by weight of a thermoplastic resin selected from the group consisting of polyolefins, styrene resins, polyesters and polyamides and 1 to 50 parts by weight of a brominated flame retardant, 0.01 to 5.0 parts by weight of Component (a): a dolomite compound.

(7) A flame-retarded thermoplastic resin composition obtainable by adding, to an original flame retarded thermoplastic resin composition composed of 100 parts by weight of a thermoplastic resin selected from the group consisting of polyolefins, styrene resins, polyesters and polyamides and 1 to 50 parts by weight of a brominated flame retardant, 0.01 to 5.0 parts by weight of Component (a): natural dolomite and/or synthetic dolomite composed of a calcium carbonate-magnesium carbonate complex salt.

(8) A flame-retarded thermoplastic resin composition obtainable by adding, to an original flame retarded thermoplastic resin composition composed of 100 parts by weight of a thermoplastic resin selected from the group consisting of polyolefins, styrene resins, polyesters and polyamides and 1 to 50 parts by weight of a brominated flame retardant, 0.01 to 5.0 parts by weight of Component (a): natural dolomite and/or synthetic dolomite composed of a calcium carbonate-magnesium carbonate complex salt, each having a magnesium to calcium weight ratio of 5:95 to 95:5 in terms of MgO:CaO.

(9) A flame-retarded thermoplastic resin composition obtainable by adding, to an original flame retarded thermoplastic resin composition composed of 100 parts by weight of a thermoplastic resin selected from the group consisting of polyolefins, styrene resins, polyesters and polyamides and 1 to 50 parts by weight of a brominated flame retardant, 0.01 to 5.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO.

(10) A flame-retarded thermoplastic resin composition obtainable by adding, to an original flame retarded thermoplastic resin composition composed of 100 parts by weight of a thermoplastic resin selected from the group consisting of polyolefins, styrene resins, polyesters and polyamides and 3 to 30 parts by weight of a brominated flame retardant, 0.05 to 3.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO.

(11) A flame-retarded styrene resin composition obtainable by adding, to an original flame-retarded styrene resin composition composed of 100 parts by weight of a styrene resin and 1 to 50 parts by weight of a brominated flame retardant;

0.01 to 5.0 parts by weight of Component (a): a dolomite compound.

(12) A flame-retarded styrene resin composition obtainable by adding, to an original flame-retarded styrene resin composition composed of 100 parts by weight of a styrene resin and 1 to 50 parts by weight of a brominated flame retardant, 0.01 to 5.0 parts by weight of Component (a): natural dolomite and/or synthetic dolomite composed of a calcium carbonate-magnesium carbonate complex salt.

(13) A flame-retarded styrene resin composition obtainable by adding, to an original flame-retarded styrene resin composition composed of 100 parts by weight of a styrene resin and 1 to 50 parts by weight of a brominated flame retardant, 0.01 to 5.0 parts by weight of Component (a): natural dolomite and/or synthetic dolomite composed of a calcium carbonate-magnesium carbonate complex salt, each having a magnesium to calcium weight ratio of 5:95 to 95:5 in terms of MgO:CaO.

(14) A flame-retarded styrene resin composition obtainable by adding, to an original flame-retarded styrene resin composition composed of 100 parts by weight of a styrene resin and 1 to 50 parts by weight of a brominated flame retardant, 0.01 to 5.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO.

(15) A flame-retarded styrene resin composition obtainable by adding, to an original flame-retarded styrene resin composition composed of 100 parts by weight of a styrene resin and 3 to 30 parts by weight of a brominated flame retardant, 0.05 to 3.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO.

(16) A flame-retarded thermoplastic resin composition obtainable by adding, to an original flame-retarded thermoplastic resin composition composed of 100 parts by weight of a thermoplastic resin and 1 to 50 parts by weight of a brominated flame retardant, 0.01 to 5.0 parts by weight of Component (a): a dolomite compound; and, in combination therewith, 0.01 to 5.0 parts by weight of at least one compound selected from the group consisting of:
Component (b): a hydrotalcite,
Component (c): a zinc-substituted hydrotalcite compound, and
Component (d): a zeolite compound.

(17) A flame-retarded thermoplastic resin composition obtainable by adding, to an original flame-retarded thermoplastic resin composition composed of 100 parts by weight of a thermoplastic resin and 1 to 50 parts by weight of a brominated flame retardant, 0.01 to 5.0 parts by weight of Component (a): natural dolomite and/or synthetic dolomite composed of a calcium carbonate-magnesium carbonate complex salt; and, in combination therewith, 0.01 to 5.0 parts by weight of at least one compound selected from the group consisting of:
Component (b): a hydrotalcite,
Component (c): a zinc-substituted hydrotalcite compound, and
Component (d): a zeolite compound.

(18) A flame-retarded thermoplastic resin composition obtainable by adding, to an original flame-retarded thermoplastic resin composition composed of 100 parts by weight of a thermoplastic resin and 1 to 50 parts by weight of a brominated flame retardant, 0.01 to 5.0 parts by weight of Component (a): natural dolomite and/or synthetic dolomite composed of a calcium carbonate-magnesium carbonate complex salt, each having a magnesium to calcium weight ratio of 5:95 to 95:5 in terms of MgO:CaO; and, in combination therewith, 0.01 to 5.0 parts by weight of at least one compound selected from the group consisting of:
Component (b): a hydrotalcite,
Component (c): a zinc-substituted hydrotalcite compound, and
Component (d): a zeolite compound.

(19) A flame-retarded thermoplastic resin composition obtained by adding, to an original flame-retarded thermoplastic resin composition composed of 100 parts by, weight of a thermoplastic resin and 1 to 50 parts by weight of a brominated flame retardant, 0.01 to 5.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO; and, in combination therewith, 0.01 to 5.0 parts by weight of at least one compound selected from the group consisting of:
Component (b): a hydrotalcite,
Component (c): a zinc-substituted hydrotalcite compound, and
Component (d): a zeolite compound.

(20) A flame-retarded thermoplastic resin composition obtainable by adding, to an original flame-retarded thermoplastic resin composition composed of 100 parts by weight of a thermoplastic resin and 3 to 30 parts by weight of a brominated flame retardant, 0.05 to 3.0 parts by weight of Component (a); light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO; and, in combination therewith, 0.05 to 3.0 parts by weight of at least one compound selected from the group consisting of:
Component (b): a hydrotalcite,
Component (c): a zinc-substituted hydrotalcite compound, and
Component (d): a zeolite compound.

(21) A flame-retarded thermoplastic resin composition obtainable by adding, to an original flame retarded thermoplastic resin composition composed of 100 parts by weight of a thermoplastic resin selected from the group consisting of polyolefins, styrene resins, polyesters and polyamides and 1 to 50 parts by weight of a brominated flame retardant, 0:01 to 5.0 parts by weight of Component (a): a dolomite; and, in combination therewith, 0.01 to 5.0 parts by weight of at least one compound selected from the group consisting of;
Component (b): a hydrotalcite,
Component (c): a zinc-substituted hydrotalcite compound, and
Component (d): a zeolite compound.

(22) A flame-retarded thermoplastic resin composition obtainable by adding, to an original flame retarded thermoplastic resin composition composed of 100 parts by weight of a thermoplastic resin selected from the group consisting of polyolefins, styrene resins, polyesters and polyamides and 1 to 50 parts by weight of a brominated flame retardant, 0.01 to 5.0 parts by weight of Component (a): natural dolomite and/or synthetic dolomite composed of a calcium carbonate-magnesium carbonate complex salt; and, in combination therewith, 0.01 to 5.0 parts by weight of at least one compound selected from the group consistin of:
Component (b): a hydrotalcite,
Component (c): a zinc-substituted hydrotalcite compound, and
Component (d): a zeolite compound.

(23) A flame-retarded thermoplastic resin composition obtainable by adding, to an original flame retarded thermoplastic resin composition composed of 100 parts by weight of a thermoplastic resin selected from the group consisting of polyolefins, styrene resins, polyesters and polyamides and 1 to 50 parts by weight of a brominated flame retardant, 0.01 to 50 parts by weight of Component (a): natural dolomite and/or synthetic dolomite composed of a calcium carbonate-magnesium carbonate complex salt, each having a magnesium to calcium weight ratio of 5:95 to 95:5 in terms of MgO:CaO; and, in combination therewith, 0.01 to 5.0 parts by weight of at least one compound selected from the group consisting of:
Component (b): a hydrotalcite,
Component (c): a zinc-substituted hydrotalcite compound, and
Component (d): a zeolite compound.

(24) A flame-retarded thermoplastic resin composition obtainable by adding, to an orifinal flame retarded thermoplastic resin composition composed of 100 parts by weight of a thermoplastic resin selected from the group consisting of polyolefins, styrene resins, polyesters and polyamides and 1 to 50 parts by weight of a brominated flame retardant, 0.01 to 5.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO; and, in combination therewith, 0.01 to 5.0 parts by weight of at least one compound selected from the group consisting of:
Component (b): a hydrotalcite,
Component (c): a zinc-substituted hydrotalcite compound, and
Component (d): a zeolite compound.

(25) A flame-retarded thermoplastic resin composition obtainable by adding, to an original flame retarded thermoplastic resin composition composed of 100 parts by weight of a thermoplastic resin selected from the group consisting of polyolefins, styrene resins, polyesters and polyamides and 3 to 30 parts by weight of a brominated flame retardant, 0.05 to 3.0 parts by weight of Component (a): light burned dolomite obtainable by light burning natural dolomite and /or synthetic dolomite composed of a calcium carbonate-magnesium carbonate complex salt, each having a magnesium to calcium weight ratio of 5:95 to 95:5 in terms of MgO:CaO; and, in combination therewith, 0.05 to 3.0 parts by weight of at least one compound selected from the group consisting of:
Component (b): a hydrotalcite,
Component (c): a zinc-substituted hydrotalcite compound,and
Component (d): a zeolite compound.

(26) A flame-retarded styrene resin composition obtainable by adding, to an original flame-retarded styrene resin composition composed of 100 parts by weight of a styrene resin and 1 to 50 parts by weight of a brominated flame retardant, 0.01 to 5.0 parts by weight of Component (a): a dolomite compound; and, in combination therewith, 0.01 to 5.0 parts by-weight of at least one compound selected from the group consisting of:
Component (b): a hydrotalcite,
Component (c): a zinc-substituted hydrotalcite compound, and
Component (d): a zeolite compound.

(27) A flame-retarded thermoplastic resin composition obtainable by adding, to an original flame-retarded styrene resin composition composed of 100 parts by weight of a styrene resin and 1 to 50 parts by weight of a brominated flame retardant, 0.01 to 5.0 parts by weight of Component (a): natural dolomite and/or synthetic dolomite composed of a calcium carbonate-magnesium carbonate complex salt; and, in combination therewith;

0.01 to 5.0 parts by weight of at least one compound selected from the group consistin of:
Component (b): a hydrotalcite,
Component (c): a zinc-substituted hydrotalcite compound, and
Component (d): a zeolite compound.

(28) A flame-retarded styrene resin composition obtainable by adding to an original flame-retarded styrene resin composition composed of 100 parts by weight of a styrene resin and 1 to 50 parts by weight of a brominated flame retardant, 0.01 to 5.0 parts by weight of Component (a): natural dolomite and/or synthetic dolomite composed of a calcium carbonate-magnesium carbonate complex salt, each having a magnesium to calcium weight ratio of 5:95 to 95:5 in terms of MgO:CaO; and, in combination therewith, 0.01 to 5.0 parts by weight of at least one compound selected from the group consisting of:
Component (b): a hydrotalcite,
Component (c): a zinc-substituted hydrotalcite compound, and
Component (d): a zeolite compound.

(29) A flame-retarded styrene resin composition obtainable by adding to an original flame-retarded styrene resin composition composed of 100 parts by weight of a styrene resin and 1 to 50 parts by weight of a brominated flame retardant, 0.01 to 5.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO; and, in combination therewith, 0.01 to 5.0 parts by weight of at least one compound selected from the group consisting of:
Component (b): a hydrotalcite,
Component (c): a zinc-substituted hydrotalcite compound, and
Component (d): a zeolite compound.

(30) A flame-retarded styrene resin composition obtainable by adding, to an original flame-retarded styrene resin composition composed of 100 parts by weight of a styrene resin and 3 to 30 parts by weight of a brominated flame retardant, 0.05 to 3.0 parts by weight of Component (a): light burned dolomite obtainable by light burning natural dolomite and/or synthetic dolomite composed of a calcium carbonate-magnesium carbonate complex salt, each having a magnesium to calcium weight ratio of 5:95 to 95:5 in terms of MgO:CaO; and, in combination therewith, 0.05 to 3.0 parts by weight of at least one compound selected from the group consisting of:
Component (b): a hydrotalcite,
Component (c): a zinc-substituted hydrotalcite compound, and
Component (d): a zeolite compound.

As preferred modes for carrying out the present invention, the above-described flame-retarded thermoplastic resin compositions (2) to (5), (7) to (10), (12) to (15), (17) to (20), (22) to (25), and (27) to (30) can be mentioned, with the compositions (4), (5), (9), (10), (14), (15), (19), (20), (24), (25), (29) and (30) being more preferred. The compositions (5), (10), (15), (20), (25) and (30) are most preferred.

EXAMPLES

The present invention will hereinafter be described in detail with reference to Examples. It should, however, be borne in mind that the present invention is not limited to or by them. In these Examples, "part" or "parts" means "part or parts by weight".

Synthesis Example 1

In 200 parts of water were charged 58.3 parts of magnesium hydroxide and 74.1 parts of calcium hydroxide. While stirring at 10° C., a $CO_2$ gas was blown into the mixture for 3 hours. The precipitate thus formed was filtered, followed by drying at 50° C. or less under a $CO_2$ gas atmosphere, whereby 152.3 parts of a calcium carbonate-magnesium carbonate complex salt (synthetic dolomite) was obtained. The resulting complex salt was found to have a calcium to magnesium weight ratio of 46:54 in terms of MgO:CaO.

Synthesis Example 2

The synthetic dolomite obtained in Synthesis Example 1 was sintered at 1000° C. for 1 hour, whereby light burned synthetic dolomite was obtained.

Synthesis Example 3

The light burned synthetic dolomite (1.9 kg) obtained in Synthesis Example 2 and 0.1 kg of calcium stearate were ground under deaerated dry conditions over 24 hours. The synthetic dolomite having a surface treated with calcium stearate was found to have a median diameter of 1.1 $\mu$m.

Synthesis Example 4

Light burned dolomite [product of Tagen Sekkai Kogyo Co., Ltd.] (19.0 kg) in the unground form and 1.0 kg of calcium stearate were ground over 24 hours under deaerated dry conditions. The dolomite having a surface treated with calcium stearate was found to have a median diameter of 1.1 $\mu$m.

[Additives to be Used According to the Present Invention: Component (a)]
A-1: Dolomite [product of Tagen Sekkai Kogyo Co., Ltd.] not surface treated, but ground
A-2: Light burned dolomite [product of Tagen Sekkai Kogyo Co., Ltd.] not surface treated, but ground
A-3: Magnesia slaked lime [product of Tagen Sekkai Kogyo Co., Ltd.] not surface treated, but ground
A-4: Synthetic dolomite described in (Synthesis Example 1), not surface treated, but ground
A-5: Light burned synthetic dolomite described in (Synthesis Example 2), not surface treated, but ground
A-6: Light burned synthetic dolomite described in (Synthesis Example 3), surface treated and ground
A-7: Light burned dolomite described in (Synthesis Example 4), surface treated and ground

[Additives to be Used According to the Present Invention: Component (b)]
B-1: Hydrotalcite shown as No. 1 above in the specification
B-2: Hydrotalcite shown as No. 3 above in the specification
B-3: Hydrotalcite shown as No. 6 above in the specification

[Additives to be Used According to the Present Invention: Component (c)]
C-1: Zinc-substituted hydrotalcite compound shown as No. 10 above in the specification

[Additives to be Used According to the Present Invention: Component (d)]
D-1: Zeolite 4A compound [$Na_{12}Al_{12}Si_{12}O_{48} \cdot 27H_2O$, "Toyo Builder", ex TOSOH CORPORATION]
D-2: Zeolite 5A compound ["Zeostar CA-100P", ex Nippon Chemical Industrial Co., Ltd.]
D-3: Zinc-substituted zeolite (The zinc substitution ratio of D-3 is 70 mole %.)

[Additives not Specified According to the Present Invention: Component (e)]
E-1: Magnesium oxide
E-2: Calcium oxide
E-3: Magnesium carbonate
E-4: Calcium carbonate
E-5: Magnesium hydroxide
E-6: Calcium hydroxide
E-7: Magnesium stearate
E-8: Calcium stearate

Example 1

Additive(s) as shown in Table 1 was or were added in amounts as indicated in the same table, to 100 parts of an HIPS resin ["Styron 492", ex Asahi Chemical Industry Co., Ltd.], 15 parts of bis(pentabromophenyl)ethane ["Saytex 8010", ex Albemarle Corporation], 2 parts of antimony trioxide and 0.5 part of polyethylene wax ["HI-WAX 400PF", ex Mitsui Petrochemical Industries, Ltd.], followed by mixing in a Henschel mixer. The resulting mixtures were kneaded under molten state at 200° C. with an extruder, whereby pellets were obtained. These pellets were injection molded at 230° C., whereby flat plates of 52 mm×40 mm×3 mm were obtained. The flat plates were wrapped double with an aluminum foil and put into a Geer oven set at 255° C. Times (minutes) until they were deteriorated into dark brown color, were measured. The results are shown in Table 1 below. The longer the time, the better the heat stabilizing effects.

TABLE 1

| Sample No. | Additive, added amount in parts | | | Heat Stability (min) |
|---|---|---|---|---|
| | Component (a) | Component (b), (c), (d) | Component (e) | |
| 1 | A-1, 1.0 | | | 70 |
| 2 | A-2, 1.0 | | | 85 |
| 3 | A-3, 1.0 | | | 75 |
| 4 | A-5, 1.0 | | | 85 |
| 5 | A-6, 1.0 | | | 85 |
| 6 | A-7, 1.0 | | | 85 |
| 7 | A-1, 0.1 A-2, 0.9 | | | 85 |
| 8 | A-1, 0.5 A-2, 0.5 | | | 85 |
| 9 | A-1, 0.9 A-2, 0.1 | | | 75 |
| 10 | A-2, 0.5 A-5, 0.5 | | | 90 |
| 11 | A-6, 0.5 A-7, 0.5 | | | 90 |
| 12 | A-1, 0.3 A-2, 0.4 A-3, 0.3 | | | 80 |
| 13 | A-2, 0.01 | | | 45 |
| 14 | A-2, 0.05 | | | 50 |
| 15 | A-2, 0.1 | | | 55 |
| 16 | A-2, 0.5 | | | 65 |
| 17 | A-2, 0.9 | B-1, 0.1 | | 95 |
| 18 | A-2, 0.5 | B-1, 0.5 | | 100 |
| 19 | A-2, 0.1 | B-1, 0.9 | | 90 |
| 20 | A-5, 0.5 | C-1, 0.5 | | 105 |
| 21 | A-5, 0.5 | D-1, 0.5 | | 105 |
| 22 | A-1, 0.2 A-2, 0.3 | B-1, 0.5 | | 100 |
| 23 | A-2, 0.5 | B-1, 0.2 C-1, 0.3 | | 105 |
| 24 | A-2, 0.5 | B-1, 0.1 C-1, 0.3 D-1, 0.1 | | 110 |
| 25 | A-2, 1.0 | B-1, 1.0 | | 130 |
| 26 | | B-1, 1.0 | | 35 |

TABLE 1-continued

| Sample No. | Additive, added amount in parts | | | Heat Stability (min) |
|---|---|---|---|---|
| | Component (a) | Component (b), (c), (d) | Component (e) | |
| 27 | | C-1, 1.0 | | 40 |
| 28 | | D-1, 1.0 | | 40 |
| 29 | | | E-1, 1.0 | 20 |
| 30 | | | E-2, 1.0 | 15 |
| 31 | | | E-3, 1.0 | 20 |
| 32 | | | E-4, 1.0 | 20 |
| 33 | | | E-5, 1.0 | 20 |
| 34 | | | E-6, 1.0 | 20 |
| 35 | | | E-7, 1.0 | 15 |
| 36 | | | E-8, 1.0 | 15 |
| 37 | | | E-1, 0.5 E-2, 0.5 | 15 |
| 38 | | | E-3, 0.5 E-4, 0.5 | 20 |
| 39 | | | E-5, 0.5 E-6, 0.5 | 20 |
| 40 | A-2, 0.005 | | | 20 |
| 41 | A-2, 0.005 | B-1, 0.005 | | 25 |
| 42 | A-2, 0.005 | B-1, 0.002 C-1, 0.001 D-1, 0.002 | | 25 |
| 43 | | Not added. | | 10 |

Samples Nos. 1 to 25 are compositions of the present invention, while Samples Nos. 26 to 43 are those for the sake of comparison. As is apparent from comparison among the results of Table 1, the flame retarded thermoplastic resin compositions of the present invention are excellent in heat stabilizing effects. Heat stabilizing effects of the compositions such as Samples Nos. 17 to 25, each using Component (a) and, in combination therewith, at least one of Component (b), Component (c) and Component (d), are superior to those of the compositions such as Samples Nos. 1 to 16, each using Component (a) only. On the other hand, sufficient heat stabilizing effects can not be provided when the composition, as in the case of Samples Nos. 26 to 28, contains not Component (a) but only one out of Component (b), Component (c) and Component (d), when the composition, as in the case of Samples Nos. 29 to 39, contains only an additive not specified according to the present invention (Component (e)), when the composition, as in the case of Sample No. 40, contains Component (a), but in an amount less than the range specified according to the present invention, when the composition, as in the case of Samples Nos. 41 and 42, contains Component (a) and, in combination therewith, at least one compound selected from the group consisting of Component (b), Component (c) and Component (d), but in an amount less than the range specified according to the present invention, or when the composition, as in the case of Sample No. 43, is free of an additive.

Example 2

Additive(s) as shown in Table 2 was or were added in amounts as indicated in the same table, to 100 parts of an HIPS resin ["Styron 492", ex Asahi Chemical Industry Co., Ltd.], 4 parts of hexabromocyclododecane ["Great Lakes CD-75P", ex Great Lakes Chemical Corporation] and 0.5 parts of polyethylene wax ["HI-WAX 400PF", ex Mitsui Petrochemical Industries, Ltd.], followed by mixing in a Henschel mixer. The resulting mixtures were kneaded under molten state at 180° C. with an extruder, whereby pellets were obtained. These pellets were injection molded at 185° C. into flat plates of 52 mm×40 mm×3 mm. The flat plates were wrapped double with an aluminum foil and put into a Geer oven set at 240° C. Times (minutes) until they were deteriorated into a dark brown color, were measured. The results are shown in Table 2. The longer the time, the better the heat stabilizing effects.

TABLE 2

| Sample No. | Additive, added amount in parts | | | Heat Stability (min) |
|---|---|---|---|---|
| | Component (a) | Component (b), (c), (d) | Component (e) | |
| 1 | A-1, 0.5 | | | 30 |
| 2 | A-2, 0.5 | | | 35 |
| 3 | A-3, 0.5 | | | 30 |
| 4 | A-4, 0.5 | | | 30 |
| 5 | A-5, 0.5 | | | 35 |
| 6 | A-7, 0.5 | | | 35 |
| 7 | A-1, 0.2 A-2, 0.3 | | | 35 |
| 8 | A-1, 0.1 A-2, 0.3 A-3, 0.1 | | | 35 |
| 9 | A-2, 0.01 | B-1, 0.01 | | 40 |
| 10 | A-2, 0.05 | B-1, 0.05 | | 40 |
| 11 | A-2, 0.1 | B-1, 0.1 | | 45 |
| 12 | A-5, 0.1 | B-2, 0.4 | | 50 |
| 13 | A-5, 0.25 | C-1, 0.25 | | 50 |
| 14 | A-5, 0.4 | D-1, 0.1 | | 50 |
| 15 | A-2, 0.3 | D-3, 0.2 | | 55 |
| 16 | A-7, 0.3 | B-1, 0.1 C-1, 0.1 | | 50 |
| 17 | A-7, 0.2 | B-1, 0.1 C-1, 0.1 D-1, 0.1 | | 50 |
| 18 | | B-1, 0.5 | | 20 |
| 19 | | C-1, 0.5 | | 15 |
| 20 | | D-1, 0.5 | | 20 |
| 21 | | C-1, 0.2 D-1, 0.3 | | 20 |
| 22 | | B-1, 0.1 C-1, 0.2 D-1, 0.2 | | 20 |
| 23 | | | E-1, 0.5 | 10 |
| 24 | | | E-2, 0.5 | 10 |
| 25 | | | E-3, 0.5 | 10 |
| 26 | | | E-4, 0.5 | 10 |
| 27 | | | E-5, 0.5 | 10 |
| 28 | | | E-6, 0.5 | 10 |
| 29 | | | E-7, 0.5 | 5 |
| 30 | | | E-8, 0.5 | 5 |
| 31 | | | E-1, 0.3 E-2, 0.2 | 10 |
| 32 | | | E-3, 0.3 E-4, 0.2 | 10 |
| 33 | | | E-5, 0.3 E-6, 0.2 | 10 |
| 34 | | Not added. | | 5 |

Samples Nos. 1 to 27 are compositions of the present invention, while Samples Nos. 18 to 34 are those for the sake of comparison. As is apparent from comparison among the results of Tables 2, the flame retarded thermoplastic resin compositions of the present invention are excellent in heat stabilizing effects. Heat stabilizing effects of the compositions such as Samples Nos. 9 to 17, each using Component (a) and at least one out of Component (b), Component (c) and Component (d) in combination, are superior to those of the compositions such as Samples Nos. 1 to 9, each using Component (a) only. On the other hand, sufficient heat stabilizing effects can not be obtained when the composition, as in the case of Samples Nos. 18 to 22, contains not Component (a), but at least one out of Component (b), Component (c) and Component (d), when the composition, as in the case of Samples Nos. 23 to 33, contains only Component (e), that is, an additive not specified according to the present invention, or when the composition, as in the case of Sample No. 34, is free of an additive.

Example 3

Additive(s) as shown in Table 3 was or were added in amounts as indicated in the same table, to 100 parts of an ABS resin ["TECHNO ABS 130NP", ex Techno Polymer Co., Ltd.], 15 parts of bis(pentabromophenyl)ethane ["Saytex 8010", ex Albemarle Corporation], 15 parts of brominated bisphenol A epoxy resin ["PRATHERM EC-14", ex Dainippon Ink & Chemicals, Incorporated], 3 parts of antimony trioxide and 0.5 part of polyethylene wax ["HI-WAX 400PF", ex Mitsui Petrochemical Industries, Ltd.], followed by mixing in a Henschel mixer. The resulting mixtures were kneaded under molten state at 200° C. with an extruder, whereby pellets were obtained. These pellets were injection molded at 240° C. into flat plates of 52 mm×40 mm×3 mm. The flat plates were wrapped double with an aluminum foil and put into a Geer oven set at 260° C. Times (minutes) until they were deteriorated into a dark brown color, were measured. The results are shown in Table 3. The longer the time, the better the heat stabilizing effects.

TABLE 3

| Sample No. | Additive, added amount in parts | | | Heat Stability (min) |
|---|---|---|---|---|
| | Component (a) | Component (b), (c), (d) | Component (e) | |
| 1 | A-1, 3.0 | | | 90 |
| 2 | A-2, 3.0 | | | 95 |
| 3 | A-3, 3.0 | | | 90 |
| 4 | A-4, 3.0 | | | 90 |
| 5 | A-5, 3.0 | | | 95 |
| 6 | A-7, 3.0 | | | 95 |
| 7 | A-4, 5.0 | | | 110 |
| 8 | A-4, 1.5 A-5, 1.5 | | | 95 |
| 9 | A-6, 1.5 A-7, 1.5 | | | 95 |
| 10 | A-1, 2.0 | B-2, 1.0 | | 115 |
| 11 | A-1, 1.5 | C-1, 1.5 | | 115 |
| 12 | A-1, 1.0 | D-1, 2.0 | | 120 |
| 13 | A-1, 3.0 | D-1, 3.0 | | 130 |
| 14 | A-1, 5.0 | D-1, 5.0 | | 135 |
| 15 | A-2, 1.5 | B-1, 0.5 D-1, 1.0 | | 125 |
| 16 | A-2, 1.0 | B-1, 0.5 C-1, 1.0 D-1, 0.5 | | 130 |
| 17 | A-2, 1.0 A-3, 1.0 | D-2, 1.0 | | 120 |
| 18 | A-2, 1.0 A-3, 1.0 | B-3, 0.5 C-1, 0.5 | | 120 |
| 19 | A-2, 1.0 A-3, 0.5 | B-2, 0.5 C-1, 0.5 D-2, 0.5 | | 125 |
| 20 | | B-1, 3.0 | | 75 |
| 21 | | B-3, 3.0 | | 70 |
| 22 | | C-1, 3.0 | | 75 |
| 23 | | D-2, 3.0 | | 70 |
| 24 | | B-1, 1.5 C-1, 1.5 | | 75 |
| 25 | | B-1, 1.0 C-1, 1.0 D-3, 1.0 | | 80 |
| 26 | | | E-1, 3.0 | 35 |
| 27 | | | E-2, 3.0 | 35 |
| 28 | | | E-3, 3.0 | 30 |
| 29 | | | E-4, 3.0 | 30 |
| 30 | | | E-5, 3.0 | 35 |
| 31 | | | E-6, 3.0 | 35 |
| 32 | | | E-7, 3.0 | 30 |
| 33 | | | E-8, 3.0 | 25 |

TABLE 3-continued

| Sample No. | Additive, added amount in parts | | | Heat Stability (min) |
|---|---|---|---|---|
| | Component (a) | Component (b), (c), (d) | Component (e) | |
| 34 | | | E-1, 1.5<br>E-2, 1.5 | 35 |
| 35 | | | E-3, 1.5<br>E-4, 1.5 | 30 |
| 36 | | | E-5, 1.5<br>E-6, 1.5 | 35 |
| 37 | A-4, 6.0 | | | 85 |
| 38 | A-1, 6.0 | B-2, 6.0 | | 90 |
| 39 | A-1, 6.0 | B-1, 2.0<br>C-1, 2.0<br>D-1, 2.0 | | 90 |
| 40 | | Not added. | | 10 |

Samples Nos. 1 to 19 are compositions of the present invention, while Samples Nos. 20 to 40 are those for the sake of comparison. As is apparent from comparison among the results of Table 3, the flame retarded thermoplastic resin compositions of the present invention are excellent in heat stabilizing effects. Heat stabilizing effects of the compositions such as Samples Nos. 10 to 19, each using Component (a) and, in combination therewith, at least one of Component (b), Component (c) and Component (d), are superior to those of the compositions such as Samples Nos. 1 to 9, each using Component (a) only. On the other hand, sufficient heat stabilizing effects can not be provided when the composition, as in the case of Samples Nos. 20 to 25, contains not Component (a), but at least one out of Component (b), Component (c) and Component (d), When the composition, as in the case of Samples Nos. 26 to 36, contains only Component (e), an additive not specified according to the present invention, or when the composition, as in the case of Sample No. 40, is free of an additive. Heat stabilizing effects expected from an increase in the amount are not obtained when as in the case of Sample No. 37, the amount of Component (a) exceeds the range specified according to the present invention or when as in the case of Samples Nos. 38 and 39, the amount of at least one component selected from the group consisting of Component (b), Component (c) and Component (d) to be used in combination with Component (a) exceeds the range specified according to the present invention.

Example 4

Additive(s) as shown in Table 4 was or were added in amounts as indicated in the same table, to 100 parts of a polypropylene resin ["Idemitsu Polypro J-2000G", ex Idemitsu Petrochemical Co., Ltd.], 7 parts of tetrabomobisphenol A bis(2,3-dibromopropylether) ["Fire Guard 3100", ex Teijin Chemicals Ltd.], 5 parts of antimony oxide and 0.5 parts of polyethylene wax ["HI-WAX 400PF", ex Mitsui Petrochemical Industries, Ltd.], followed by mixing in a Henschel mixer. The resulting mixtures were kneaded under molten state at 210° C. with an extruder, whereby pellets were obtained. These pellets were injection molded at 220° C. into flat plates of 52 mm×40 mm×3 mm. The flat plates were wrapped double with an aluminum foil and put into a Geer oven set at 255° C. Times (minutes) until they were deteriorated into a dark brown color, were measured. The results are shown in Table 4. The longer the time, the better the heat stabilizing effects.

TABLE 4

| Sample No. | Additive, added amount in parts | | | Heat Stability (min) |
|---|---|---|---|---|
| | Component (a) | Component (b), (c), (d) | Component (e) | |
| 1 | A-1, 0.5 | | | 50 |
| 2 | A-2, 0.5 | | | 55 |
| 3 | A-3, 0.5 | | | 55 |
| 4 | A-5, 0.5 | | | 55 |
| 5 | A-7, 0.5 | | | 60 |
| 6 | A-1, 0.2<br>A-2, 0.3 | | | 55 |
| 7 | A-3, 0.2<br>A-5, 0.3 | | | 60 |
| 8 | A-2, 0.2<br>A-7, 0.3 | | | 60 |
| 9 | A-2, 0.3 | B-1, 0.2 | | 70 |
| 10 | A-3, 0.3 | C-1, 0.2 | | 75 |
| 11 | A-5, 0.3 | D-1, 0.2 | | 80 |
| 12 | A-2, 0.2 | B-3, 0.1<br>C-1, 0.2 | | 70 |
| 13 | A-2, 0.2 | B-1, 0.1<br>C-1, 0.1<br>D-2, 0.1 | | 70 |
| 14 | A-2, 0.1<br>A-3, 0.2 | D-2, 0.2 | | 75 |
| 15 | A-2, 0.1<br>A-7, 0.2 | C-1, 0.1<br>D-1, 0.1 | | 80 |
| 16 | A-1, 0.1<br>A-2, 0.1 | B-1, 0.1<br>C-1, 0.1<br>D-2, 0.1 | | 75 |
| 17 | | B-1, 0.5 | | 45 |
| 18 | | C-1, 0.5 | | 45 |
| 19 | | D-2, 0.5 | | 45 |
| 20 | | B-3, 0.2<br>C-1, 0.3 | | 45 |
| 21 | | B-1, 0.1<br>C-1, 0.1<br>D-2, 0.3 | | 40 |
| 22 | | | E-1, 0.5 | 25 |
| 23 | | | E-2, 0.5 | 20 |
| 24 | | | E-3, 0.5 | 20 |
| 25 | | | E-4, 0.5 | 20 |
| 26 | | | E-5, 0.5 | 25 |
| 27 | | | E-6, 0.5 | 30 |
| 28 | | | E-7, 0.5 | 15 |
| 29 | | | E-8, 0.5 | 15 |
| 30 | | | E-1, 0.2<br>E-2, 0.3 | 25 |
| 31 | | | E-3, 0.2<br>E-4, 0.3 | 20 |
| 32 | | | E-5, 0.2<br>E-6, 0.3 | 30 |
| 33 | | Not added. | | 10 |

Samples Nos. 1 to 16 are compositions of the present invention, while Samples Nos. 17 to 33 are those for the sake of comprison. As is apparent from comparison among the results of Table 4, the flame retarded thermoplastic resin compositions of the present invention are excellent in heat stabilizing effects. Heat stabilizing effects of the compositions such as Samples Nos. 9 to 16, each using Component (a) and, in combination therewith, at least one of Component (b), Component (c) and Component (d), are superior to those of the compositions such as Samples Nos. 1 to 8, each using Component (a) only. On the other hand, sufficient heat stabilizing effects can not be obtained when the composition, as in the case of Samples Nos. 17 to 21, contains not Component (a) but at least one out of Component (b), Component (c) and Component (d), when the composition, as in the case of Samples Nos. 22 to 32, contains only Component (e), an additive not specified according to the present invention, or when the composition, as in the case of Sample No. 33, is free of additives.

Example 5

Additive(s) as shown in Table 5 was or were added in amounts as indicated in the same table, to 100 parts of a PBT resin ["PBT C-700", ex Teijin Limited], 15 parts of brominated bisphexenol A epoxy resin ["PRATHERM EP-100", ex Dainippon Ink & Chemicals, Incorporated], 5 parts of antimony oxide and 0.5 parts of polyethylene wax ["HI-WAX 400PF", ex Mitsui Petrochemical Industries, Ltd.], followed by mixing in a Henschel mixer. The resulting mixtures were kneaded under molten state at 240° C. with an extruder, whereby pellets were obtained. These pellets were injection molded at 260° C. into flat plates of 52 mm×40 mm×3 mm. The flat plates were wrapped double with an aluminum foil and put into a Geer oven set at 265° C. Times (minutes) until they were deteriorated into a dark brown color, were measured. The results are shown in Table 5. The longer the time, the better the heat stabilizing effects.

TABLE 5

| Sample No. | Additive, added amount in parts | | | Heat Stability (min) |
|---|---|---|---|---|
| | Component (a) | Component (b), (c), (d) | Component (e) | |
| 1 | A-1, 0.3 | | | 40 |
| 2 | A-2, 0.3 | | | 45 |
| 3 | A-3, 0.3 | | | 40 |
| 4 | A-5, 0.3 | | | 45 |
| 5 | A-7, 0.3 | | | 50 |
| 6 | A-1, 0.1<br>A-2, 0.2 | | | 45 |
| 7 | A-3, 0.1<br>A-5, 0.2 | | | 50 |
| 8 | A-2, 0.1<br>A-7, 0.2 | | | 55 |
| 9 | A-2, 0.1 | B-1, 0.2 | | 65 |
| 10 | A-2, 0.2 | B-1, 0.1 | | 70 |
| 11 | A-2, 0.1 | B-1, 0.1<br>C-1, 0.1 | | 70 |
| 12 | A-7, 0.1 | B-1, 0.05<br>C-1, 0.1<br>D-2, 0.05 | | 75 |
| 13 | A-2, 0.1<br>A-3, 0.1 | D-2, 0.1 | | 75 |
| 14 | A-2, 0.1<br>A-7, 0.05 | B-1, 0.05<br>C-1, 0.1 | | 80 |
| 15 | A-1, 0.05<br>A-7, 0.05 | B-1, 0.05<br>C-1, 0.1<br>D-1, 0.05 | | 75 |
| 16 | | B-1, 0.3 | | 30 |
| 17 | | C-1, 0.3 | | 35 |
| 18 | | D-1, 0.3 | | 35 |
| 19 | | B-2, 0.2<br>C-1, 0.1 | | 30 |
| 20 | | B-1, 0.1<br>C-1, 0.1<br>D-2, 0.1 | | 35 |
| 21 | | | E-1, 0.3 | 20 |
| 22 | | | E-2, 0.3 | 20 |
| 23 | | | E-3, 0.3 | 15 |
| 24 | | | E-4, 0.3 | 15 |
| 25 | | | E-5, 0.3 | 20 |
| 26 | | | E-6, 0.3 | 20 |
| 27 | | | E-7, 0.3 | 15 |
| 28 | | | E-8, 0.3 | 15 |
| 29 | | | E-1, 0.2<br>E-2, 0.1 | 20 |
| 30 | | | E-3, 0.2<br>E-4, 0.1 | 15 |
| 31 | | | E-5, 0.2<br>E-6, 0.1 | 20 |
| 32 | | Not added. | | 10 |

Samples Nos. 1 to 15 are compositions of the present invention, while Samples Nos. 16 to 32 are those for the sake of comparison. As is apparent from comparison among the results of Table 5, the flame retarded thermoplastic resin compositions of the present invention are excellent in heat stabilizing effects. Heat stabilizing effects of the compositions such as Samples Nos. 9 to 15, each using Component (a) and, in combination therewith, at least one of Component (b), Component (c) and Component (d), are superior to those of the compositions such as Samples Nos. 1 to 8, each using Component (a) only. On the other hand, sufficient heat stabilizing effects can not be obtained when the composition, as in the case of Samples Nos. 16 to 20, contains not Component (a) but at least one of Component (b), Component (c) and Component (d), when the composition, as in the case of Samples Nos. 21 to 31, contains only Component (e), an additive not specified according to the present invention, or when the composition, as in the case of Sample No. 32, is free of an additive.

Effects of the Invention

The flame-retarded thermoplastic resin compositions of the present invention have markedly excellent heat stabilizing effects.

What is claimed is:

1. A flame-retardant thermoplastic resin composition which comprises an original flame-retardant thermoplastic resin composition comprising 100 parts by weight of a thermoplastic resin and 1 to 50 parts by weight of a brominated flame-retardant, and, in combination therewith, 0.01 to 5.0 parts by weight of a dolomite compound (Component (a)).

2. A flame-retardant styrene resin composition which comprises an original flame-retardant styrene resin composition comprising 100 parts by weight of a styrene resin and 1 to 50 parts by weight of a brominated flame-retardant, and, in combination therewith, 0.01 to 5.0 parts by weight of a dolomite compound (Component (a)).

3. A flame-retardant thermoplastic resin composition which comprises an original flame-retardant thermoplastic resin composition comprising 100 parts by weight of a thermoplastic resin and 1 to 50 parts by weight of a brominated flame-retardant, and, in combination therewith, 0.01 to 5.0 parts by weight of a dolomite compound (Component (a)) as well as 0.01 to 5.0 parts by weight of at least one compound selected from the group consisting of a hydrotalcite (Component (b)), a zinc-substituted hydrotalcite compound (Component (c)), and a zeolite compound (Component (d)).

4. A flame-retardant styrene resin composition which comprises an original flame-retardant styrene resin composition comprising 100 parts by weight of a styrene resin and 1 to 50 parts by weight of a brominated flame-retardant, and, in combination therewith, 0.01 to 5.0 parts by weight of a dolomite compound (Component (a)) as well as 0.05 to 5.0 parts by weight of at least one compound selected from the group consisting of a hydrotalcite (Component (b)), a zinc-substituted hydrotalcite compound (Component (c)), and a zeolite compound (Component (d)).

5. The flame-retardant thermoplastic resin composition according to claim 1 or 3, wherein said dolomite compound is a natural dolomite and/or a synthetic dolomite composed of a calcium carbonate-magnesium carbonate complex salt.

6. The flame-retardant thermoplastic resin composition according to claim 2 or 4, wherein said dolomite compound is a natural dolomite and/or a synthetic dolomite composed of a calcium carbonate-magnesium carbonate complex salt.

7. The flame-retardant thermoplastic resin composition according to claim 1 or 3, wherein said dolomite compound has a magnesium to calcium weight ratio of 5:95 to 95:5 in terms of MgO:CaO.

8. The flame-retardant styrene resin composition according to claim 2 or 4, wherein said dolomite compound has a magnesium to calcium weight ratio of 5:95 to 95:5 in terms of MgO:CaO.

9. The flame-retardant thermoplastic resin composition according to claim 1 or 3, wherein said dolomite compound contains light burned dolomite obtainable by light burning a calcium carbonate-magnesium carbonate complex salt having a magnesium to calcium weight ratio of 5:95 to 95:5 in terms of MgO:CaO.

10. The flame-retardant styrene resin composition according to claim 2 or 4, wherein said dolomite compound contains light burned dolomite obtainable by light burning a calcium carbonate-magnesium carbonate complex salt compound having a magnesium to calcium weight ratio of 5;95 to 95;5 in terms of MgO:CaO.

11. The flame-retardant thermoplastic resin composition of claim 1, which contains 0.05 to 3 parts by weight of the dolomite compound based on 100 parts by weight of the thermoplastic resin.

12. The flame-retardant thermoplastic resin composition of claim 2, which contains 0.05 to 3 parts by weight of the dolomite compound based on 100 parts by weight of the thermoplastic resin.

13. The flame-retardant thermoplastic resin composition of claim 3, which contains 0.05 to 3 parts by weight of the dolomite compound based on 100 parts by weight of the thermoplastic resin.

14. The flame-retardant thermoplastic resin composition of claim 4, which contains 0.05 to 3 parts by weight of the dolomite compound based on 100 parts by weight of the thermoplastic resin.

* * * * *